Feb. 20, 1923.
J. D. BRANSON
ATTACHMENT FOR HAND TRUCKS
Filed Oct. 22, 1920
1,446,032
2 sheets-sheet 2
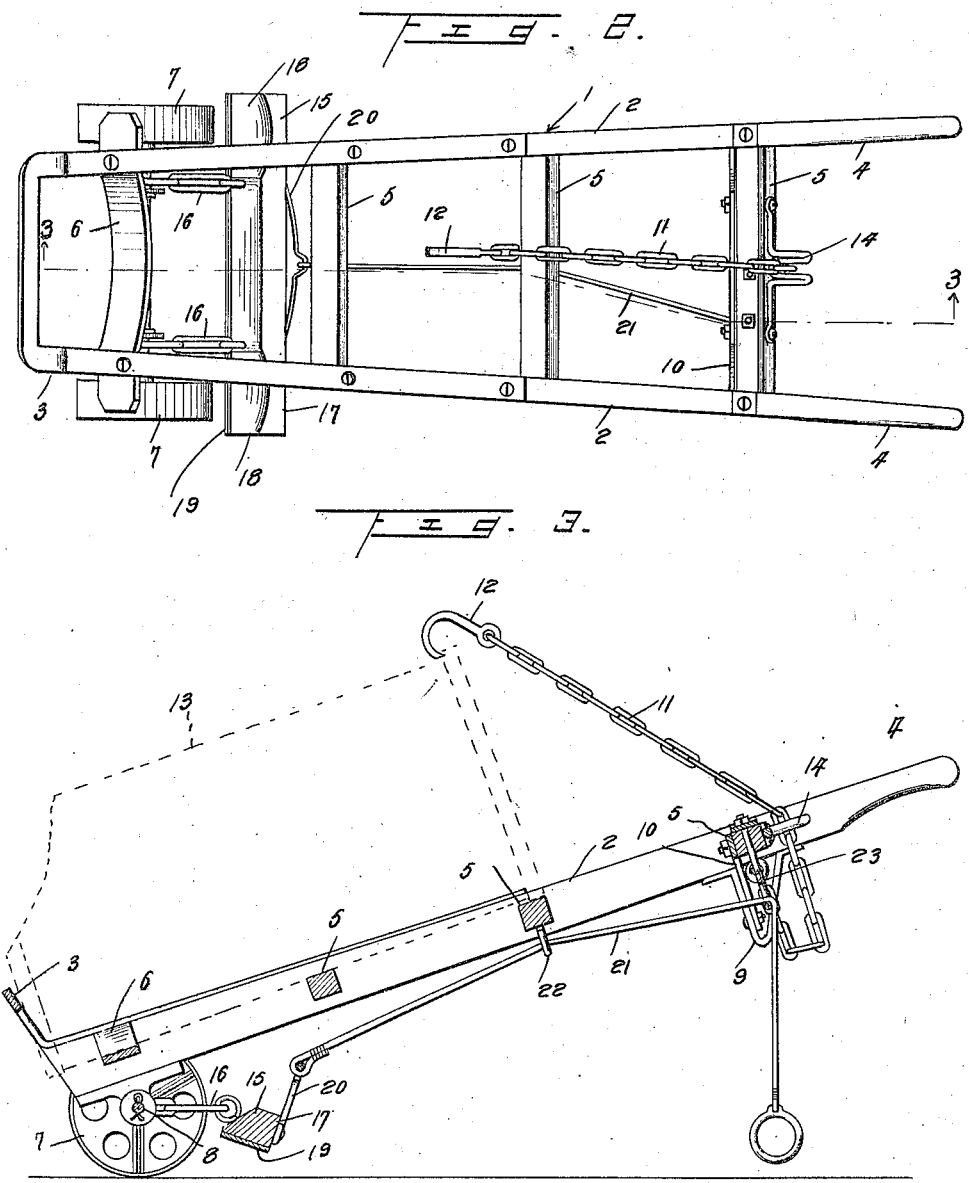
Inventor
J. D. Branson Patented Feb. 20, 1923.

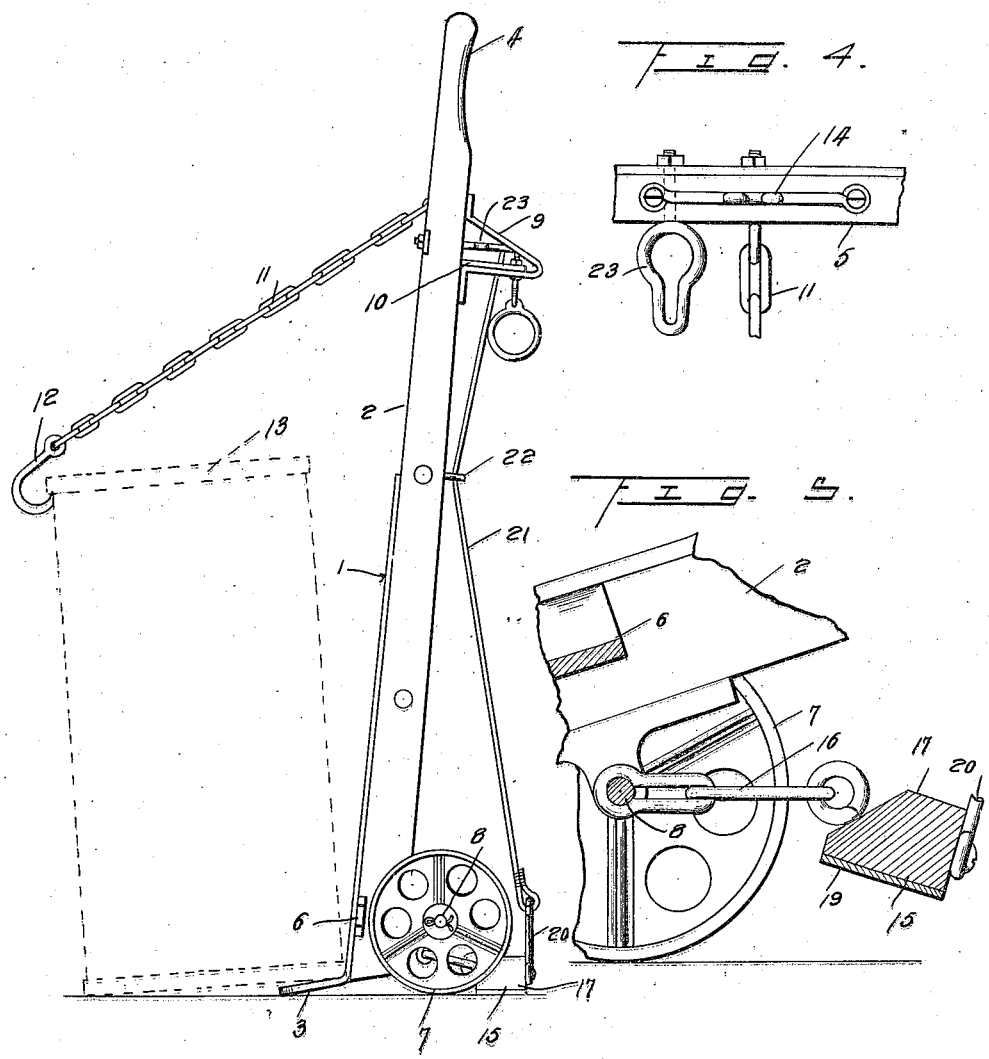

1,446,032

UNITED STATES PATENT OFFICE.

JOHN D. BRANSON, OF ASHBORO, NORTH CAROLINA.

ATTACHMENT FOR HAND TRUCKS.

Application filed October 22, 1920. Serial No. 418,675.

*To all whom it may concern:*

Be it known that I, JOHN D. BRANSON, a citizen of the United States, residing at Ashboro, in the county of Randolph and State of North Carolina, have invented certain new and useful Improvements in Attachments for Hand Trucks; and I do hereby declare the following to be a full, clear, and exact description of the invention, such as will enable others skilled in the art to which it appertains to make and use the same.

This invention relates to new and useful improvements in attachments for hand trucks and has for its primary object the provision of means which will permit one person to easily and quickly load a heavy and bulky article onto the truck and will obviate the necessity of the truckman from having to lean over and pull the article onto the truck at the same time when moving the truck from a loading position into a carrying position, thereby allowing the truckman the freedom and ease that is necessary to conveniently swing the truck downwardly from a loading position.

Another object of this invention is the provision of means adapted to prevent the truck from rolling or moving away from the article when being moved to a carrying position, thereby obviate the necessity of the truckman blocking the truck with the foot and which means may be rendered inoperative when desired.

A further object of this invention is the provision of an attachment for hand trucks of the above stated character which will be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings in which:—

Figure 1 is a side elevation, illustrating an attachment for hand trucks and illustrating the device in a position to load an article onto the truck, Figure 2 is a top plan view illustrating the device, Figure 3 is an end view illustrating a catch for holding the chock in inoperative position, Figure 4 is a fragmentary longitudinal sectional view illustrating the means of connecting the chock to the truck.

Figure 5 is a fragmentary sectional view, illustrating the chock in an elevated position.

Referring in detail to the drawings, the numeral 1 indicates a hand truck of a conventional design including the side members 2 which are connected at their forward ends by the ordinary article engaging shoe 3 while their other ends are reduced and curved to form handles 4. The side members 1 are connected by transversely extending members 5 and also by an article rest 6. The article rest 6 is curved downwardly and also has its ends projecting beyond the side members 2 to form guards for the wheels 7. The wheels 7 are journaled on an axle 8 which is attached to the side members 2 at their forward ends. The side members adjacent the handles are provided with legs 9 adapted to cooperate with the wheels in supporting the truck horizontally upon the ground. The legs are reinforced and strengthened by a brace 10.

The foregoing description relates to a well known construction of hand truck and to which my invention is applied. The member 5 adjacent the handle 4 has connected thereto a chain or flexible element 11 carrying at its free end a hook 12 adapted to engage the opposite sides of an article 13 from the side at which the truck is positioned to load said article onto the truck. The shoe 3 is positioned under the article 13 as clearly shown in Figure 1 and the hook placed in engagement with said article, thereby leaving the operator or truckman free to pull downwardly upon the handles 4 for swinging said truck into load carrying position and also drawing the article 13 onto the truck.

An anchoring member 14 is secured to the member 5 which is located adjacent the handle and is of substantially U-shape and provides means whereby the slack within the chain or flexible element 11 can be taken up after the hook 12 has been applied to the article.

A chock 15 is connected to the axle by chains or flexible elements 16 and consists of a bar 17 that extends transversely of the truck in rear of the wheels and has its front face beveled as illustrated at 18 to engage the rear faces of the wheels. The bar 17 projects slightly beyond each of the wheels and has a metal reinforcing strip 19 secured to its bottom face. An attaching rod 20 is secured to the chock 15 and in turn has connected thereto a cord or flexible element 21. The cord or flexible element 21 passes through eyelets 22 secured to the truck 1 and through a catch element 23 secured to the member 5 which is located adjacent the handle. The catch 23 is provided with a restricted slot in which the cord or flexible element may be positioned for holding the chock from engagement with the ground and also the wheels.

When the truck is in a loading position as illustrated in Figure 1 with the hook 12 applied to the article, the cord is released from the catch and the chock engages the ground or floor in rear of the wheels so that when the handles of the truck are swung downwardly to place the article 13 on the truck, the wheels will be prevented from rolling on the ground or floor and thereby prevents the truck from moving away from the article during this operation. The chock may then be elevated away from the wheels and the ground, or the same may be permitted to drag upon the ground in rear of the wheels while carrying the article from one point to another. In order to move the truck rearwardly, it is necessary that the chock be elevated away from said wheels and the ground.

While I have shown and described the preferred embodiment of my invention, it will be understood that minor changes in construction, combination and arrangement of parts may be made without departing from the spirit and scope of the invention as claimed.

Having thus described my invention, what I claim is:—

A hand truck attachment comprising a transversely extending bar arranged in rear of the wheels of a truck and having a beveled front face and a straight floor engaging face, flexible elements connected to said beveled face and to the axle of the truck, an attaching member secured to the rear face of the bar and projecting above said bar, a flexible element secured to said member and slidably connected to the truck, and a catch carried by the truck to engage the last named element at various points to permit the bar to be positioned to form a chock for the wheels of the truck by engaging said wheels and floor and to be positioned away from the wheels and floor during the movement of the truck from one point to another.

In testimony whereof I affix my signature in presence of two witnesses.

JOHN D. BRANSON.

Witnesses:
D. B. McCrary,
W. A. Bunch.